(12) United States Patent
Swanson et al.

(10) Patent No.: US 10,122,127 B2
(45) Date of Patent: Nov. 6, 2018

(54) COMPACT DRAWER OUTLET

(71) Applicant: MasterBrand Cabinets, Inc., Jasper, IN (US)

(72) Inventors: Jason Swanson, Tempe, AZ (US); Davy Daniel, Phoenix, AZ (US); Scott Ortega, Jasper, IN (US)

(73) Assignee: MASTERBRAND CABINETS, INC., Jasper, IN (US)

( * ) Notice: Subject to any disclaimer, the term of this patent is extended or adjusted under 35 U.S.C. 154(b) by 0 days.

(21) Appl. No.: 15/444,487

(22) Filed: Feb. 28, 2017

(65) Prior Publication Data

US 2017/0250509 A1 Aug. 31, 2017

Related U.S. Application Data

(60) Provisional application No. 62/301,011, filed on Feb. 29, 2016.

(51) Int. Cl.

| | |
|---|---|
| *H01R 13/72* | (2006.01) |
| *A47B 67/00* | (2006.01) |
| *A47B 97/00* | (2006.01) |
| *H02G 11/00* | (2006.01) |
| *H01R 13/74* | (2006.01) |
| *H01R 25/00* | (2006.01) |
| *H02G 3/08* | (2006.01) |

(52) U.S. Cl.
CPC ............. *H01R 13/72* (2013.01); *A47B 67/00* (2013.01); *A47B 97/00* (2013.01); *H02G 11/006* (2013.01); *H01R 13/748* (2013.01); *H01R 25/006* (2013.01); *H02G 3/081* (2013.01)

(58) Field of Classification Search
CPC ...... H01R 33/94; H01R 25/003; H01R 13/56; H01R 27/02; H01R 31/02
USPC .................... 439/162, 502; 174/69
See application file for complete search history.

(56) References Cited

U.S. PATENT DOCUMENTS

| | | | | |
|---|---|---|---|---|
| 2,143,649 | A | * | 1/1939 | Dansard ............... H01B 7/06 139/384 R |
| 2,170,557 | A | * | 8/1939 | Guarnaschelli ......... F16L 3/16 138/106 |
| 2,219,750 | A | * | 10/1940 | Parkison ............. B24D 15/087 451/324 |
| 2,446,972 | A | * | 8/1948 | Wyen ..................... E04G 1/00 182/129 |

(Continued)

OTHER PUBLICATIONS

"Dock 1000 Series" on National Lighting online: http://www.nationallighting.com/productos/dock-1000/ (Last accessed: Apr. 19, 2017).

(Continued)

*Primary Examiner* — Abdullah Riyami
*Assistant Examiner* — Vladimir Imas
(74) *Attorney, Agent, or Firm* — Calfee, Halter & Griswold LLP (57) ABSTRACT

An electrical outlet mounting apparatus having a plurality of arms being rotatably connected to each other in a sequence and being collapsible into a collapsed position and extendable into an extended position. The plurality of arms including a channel on the interior of each of the arms that can receive an electrical cord. The mounting apparatus having a mounting plate rotatably attached to the plurality of arms and having one or more electrical connections electrically connected to the electrical cord.

15 Claims, 10 Drawing Sheets

(56) References Cited

U.S. PATENT DOCUMENTS

| | | | | |
|---|---|---|---|---|
| 2,782,285 A * | 2/1957 | Cantlin | G01F 23/248 | 337/382 |
| 2,865,979 A * | 12/1958 | Klassen | H02G 11/006 | 174/117 R |
| 3,002,663 A * | 10/1961 | Fernelius | F16M 13/04 | 224/908 |
| 3,160,349 A * | 12/1964 | Kent | F21V 21/14 | 248/200 |
| 3,219,303 A * | 11/1965 | Hjalmar | F16H 21/00 | 248/280.11 |
| 3,291,977 A * | 12/1966 | Nafe | F21V 21/26 | 362/419 |
| 3,399,909 A * | 9/1968 | Ambrose | B60D 1/62 | 137/615 |
| 3,426,190 A * | 2/1969 | Mitchell | F16M 11/10 | 248/284.1 |
| 3,685,543 A * | 8/1972 | Schwing | E04G 21/04 | 137/351 |
| 3,801,812 A * | 4/1974 | Palumbo | F21L 14/00 | 362/293 |
| 4,437,144 A * | 3/1984 | Guenther | F16M 11/10 | 362/269 |
| 4,494,177 A * | 1/1985 | Matthews | F16M 11/10 | 248/162.1 |
| 4,630,185 A * | 12/1986 | Copeland | F21V 21/28 | 362/269 |
| 4,770,384 A * | 9/1988 | Kuwazima | F16M 11/10 | 248/280.11 |
| 4,819,138 A * | 4/1989 | Polick | F21V 21/29 | 362/419 |
| 4,846,434 A * | 7/1989 | Krogsrud | F16M 11/10 | 248/123.11 |
| 5,108,061 A * | 4/1992 | Vlasak | F16M 11/2021 | 248/162.1 |
| 5,170,975 A * | 12/1992 | Chadwick | F16M 11/10 | 248/284.1 |
| 5,175,398 A * | 12/1992 | Hofmann | B65H 75/36 | 174/135 |
| 5,460,441 A | 10/1995 | Hasting et al. | | |
| 5,746,389 A * | 5/1998 | Willmann | B65H 75/36 | 174/69 |
| 5,906,507 A * | 5/1999 | Howard | B65H 75/36 | 174/135 |
| 6,070,742 A * | 6/2000 | McAnally | H05K 7/1491 | 211/26 |
| 6,086,228 A * | 7/2000 | McGowan | F21V 21/088 | 359/802 |
| 6,305,556 B1 | 10/2001 | Mayer | | |
| 6,378,829 B1 * | 4/2002 | Strater | F16M 11/10 | 248/276.1 |
| 6,336,691 B1 | 8/2002 | Maroney et al. | | |
| 6,435,354 B1 | 8/2002 | Gray et al. | | |
| 6,550,734 B1 * | 4/2003 | Spadea | F16M 11/10 | 248/274.1 |
| 6,896,230 B2 * | 5/2005 | Cvek | F16M 11/10 | 248/276.1 |
| 7,188,812 B2 * | 3/2007 | Wang | F16M 11/2064 | 248/276.1 |
| 7,258,583 B1 * | 8/2007 | Baiza | H02G 3/0431 | 174/72 A |
| 7,317,611 B2 * | 1/2008 | Dittmer | F16M 11/10 | 248/917 |
| 7,334,606 B1 * | 2/2008 | Hurley | F16K 31/46 | 137/899 |
| 7,530,825 B2 * | 5/2009 | Sato | B60R 16/0207 | 439/162 |
| 7,748,666 B2 * | 7/2010 | Oddsen, Jr. | F16M 11/10 | 248/123.11 |
| 7,795,540 B2 * | 9/2010 | Yamada | H01B 7/06 | 174/117 F |
| 7,798,682 B1 * | 9/2010 | Cvek | F21S 2/00 | 362/257 |
| 8,383,942 B2 * | 2/2013 | Hsieh | H01R 31/06 | 174/69 |
| 8,585,001 B2 * | 11/2013 | Huang | F16M 11/08 | 248/278.1 |
| 8,701,897 B2 * | 4/2014 | Bailey | B65H 75/36 | 137/615 |
| 8,746,642 B2 * | 6/2014 | Molter | F16M 11/10 | 248/284.1 |
| 9,074,721 B2 * | 7/2015 | Lau | F16M 13/02 | |
| 9,115,928 B2 * | 8/2015 | Akalan | F25D 23/028 | |
| 9,281,676 B2 * | 3/2016 | Chen | H05K 7/1491 | |
| 9,316,346 B2 * | 4/2016 | Lau | F16M 11/126 | |
| 9,331,430 B2 | 5/2016 | Dickey | | |
| 9,382,685 B2 * | 7/2016 | Maki | E21C 47/00 | |
| 9,429,204 B2 * | 8/2016 | Stefan | A61B 1/00149 | |
| 9,534,730 B2 * | 1/2017 | Black | F16M 11/10 | |
| 9,657,889 B1 * | 5/2017 | Chumakov | F16M 13/00 | |
| 9,668,372 B2 * | 5/2017 | Chen | H05K 7/1491 | |
| 2003/0075658 A1 * | 4/2003 | Beissel, Jr. | F16M 11/10 | 248/284.1 |
| 2010/0181440 A1 * | 7/2010 | Larsen | F16L 3/015 | 248/68.1 |
| 2013/0341471 A1 * | 12/2013 | Yang | H05K 7/1491 | 248/70 |
| 2015/0096952 A1 * | 4/2015 | Hall | E21B 15/00 | 211/132.1 |
| 2015/0342081 A1 * | 11/2015 | Chang | H05K 7/18 | 361/679.02 |

OTHER PUBLICATIONS

"Purchase an In-Drawer Power Outlet, Clear Your Device Clutter" online: https://web.archive.org/web/20160401154910/http://www.dockingdrawer.com:80/store/c1/Featured_Products.html (archived Jan. 10, 2016) (Last Accessed: Apr. 19, 2017).

"Explore Charge Organize, Organize Hide, and more!" on Pinterest online: https://www.pinterest.com/pin/271693789991521025/ (Last accessed: Apr. 19, 2017).

"GFCI power in the vanity drawers" on FineHomebuilding (2008) online: http://forums.finehomebuilding.com/breaktime/general-discussion/gfci-power-vanity-drawers (Last accessed: Apr. 19, 2017).

"Hairdryer in a drawer? Plugged in? Help!" on Houzz GardenWeb (2010) online: http://ths.gardenweb.com/discussions/2318688/hairdryer-in-a-drawer-plugged-in-help (Last accessed: Apr. 19, 2017).

"Master Bathroom—1917 craftsman bungalow master bathroom renovation" on Pinterest (2015) online: (https://www.pinterest.com/cwstylist/master-bathroom/ (Last accessed: Apr. 19, 2017).

"Outlet in Top Drawer Ideas?" on Contractor Talk (2011) online: http://www.contractortalk.com/f11/outlet-top-drawer-ideas-91493/ (Last accessed: Apr. 19, 2017).

"Please Show Me How to Hide the Hair Dryer, etc." on Houzz GardenWeb (2007) online: http://ths.gardenweb.com/discussions/2326313/please-show-me-how-to-hide-the-hairdryeretc (Last accessed: Apr. 19, 2017).

"Power strip for charging drawer" on Houzz GardenWeb (2013) online: http://ths.gardenweb.com/discussions/2621817/power-strip-for-charging-drawer (Last accessed: Apr. 19, 2017).

"TVSP030021-S" on National Lighting online: http://www.nationallighting.com/products/product/product/tvsp030021-s/ (Last accessed: Apr. 19, 2017).

* cited by examiner

COMPACT DRAWER OUTLET

FIELD OF THE INVENTION

The present invention relates generally to the field of electrical power outlets and mounting apparatus for electrical power outlets and, more particularly, to electrical power outlets and mounting apparatus for mounting a power outlet in a storage unit, such as for example, on a pull-out drawer.

BACKGROUND

It is often desirable to provide safe, convenient access to electrical outlets in a location that is not normally visible to minimize clutter associated with powering electrical devices and/or appliances during use and/or during recharging. For example, in a bathroom, it may be desirable to have access to electrical outlets inside a pullout storage unit or drawer for operating and storing multiple devices, such as a hair dryer, a curling iron and/or other devices while plugged in, but without storing them on the countertop with wires exposed and entangled while connected to an outlet. Also, for example, it may be desirable to place cellular phones, laptop computers and entertainment devices requiring frequent recharging inside a charging drawer where they may be plugged in when not in use to eliminate clutter normally associated with recharging units and wires visible on a table and/or countertop.

SUMMARY

The present patent application discloses exemplary embodiments an electrical outlet mounting apparatus having a plurality of arms. The plurality of arms being rotatably connected to each other in a sequence and being collapsible into a collapsed position and extendable into an extended position. The plurality of arms including a channel on the interior of each of the arms that can receive an electrical cord. The mounting apparatus having a mounting plate rotatably attached to the plurality of arms. The mounting plate having a strain relief feature, such as a groove that receives the electrical cord from the plurality of arms, and secures the electrical cord in place. The electrical outlet mounting apparatus having one or more electrical connections on the front side electrically connected to the electrical cord.

BRIEF DESCRIPTION OF THE DRAWINGS

The accompanying drawings, which are incorporated in and constitute a part of this specification, illustrate some embodiments disclosed herein, and together with the description, serve to explain principles of the embodiments disclosed herein.

DETAILED DESCRIPTION

The present invention will now be described with occasional reference to the illustrated embodiments of the invention. This invention may, however, be embodied in different forms and should not be construed as limited to the embodiments set forth herein, nor in any order of preference. Rather, these embodiments are provided so that this disclosure will be more thorough, and will convey the scope of the invention to those skilled in the art.

The present application describes an electrical outlet mounting apparatus that allows an electrical outlet to be mounted into a storage unit, such as for example, into a pullout component in the storage unit. While the illustrated embodiments may be described as a drawer or similar pullout component, the apparatus may be used with any suitable pullout component to which mounting a power outlet is desired. The electrical outlet mounting apparatus may be compact and may provide an electrical outlet that is not normally visible, that is easily accessible, that helps safely manage wiring, and that allows for a broad range of electrical devices to be plugged in for use and/or recharging without cluttering countertops or tables, or becoming entangled with items that are commonly found on countertops and tables.

Figure 1:
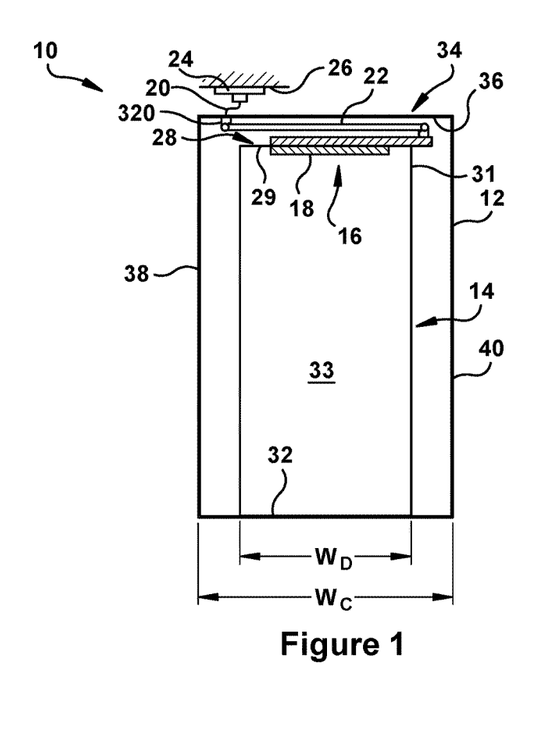
FIG. 1 is a schematic illustration of an exemplary embodiment of a drawer assembly including an electrical socket and a mounting apparatus in a collapsed position.
Figure 2:
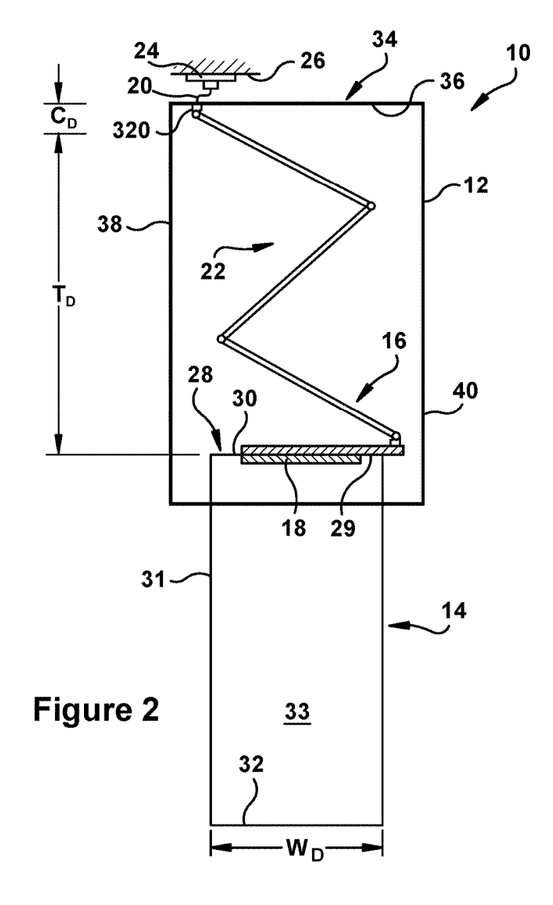
FIG. 2 is a schematic illustration the drawer assembly of FIG. 1 including an electrical outlet and a mounting apparatus an extended position.

Referring to FIGS. 1 and 2, an exemplary embodiment of a drawer assembly 10 is illustrated. The drawer assembly 10 includes a drawer housing 12, such as for example, a cabinet, having a width $W_c$, a pullout drawer 14 movable relative to the drawer housing 12 between a closed position (FIG. 1) and an open position (FIG. 2), and an electrical outlet mounting apparatus 16 that includes one or more electrical connections 18, an electrical cord 20, and a series of movable arms 22 for routing the electrical cord 20 from a power source, such as for example, an electrical socket or outlet 24 mounted in a wall 26 to the drawer 14. In the illustrated embodiment, the one or more electrical connections 18 are mounted in a rear wall 28 of the drawer 14 such that the one or more electrical connections 18 face the interior of the drawer. The rear wall 28 may have an inner surface 29 and an outer surface 30. In other embodiments, however, the one or more electrical connections 18 may be mounted on a side wall 31 of the drawer 14, on the front wall 32 of the drawer 14, on the floor 33 of the drawer, or any suitable location.

The cabinet 12 may have a back wall 34 having an inner surface 36. The distal end of the series of arms 22 may be mounted onto the inner surface 36 and the electrical cord 20 may pass through an opening (not shown) in the back wall 34 for access to the electrical socket or outlet 24. As illustrated in FIGS. 1 and 2, the distal end of the series of arms 22 may be mounted onto the inner surface 36 of the back wall 36 near a first side 38 of the cabinet 12 while the opposite end of the series of arms 22 may be mounted onto the rear wall 28 of the drawer 14 near a second side 40 of the cabinet 12 opposite the first side 38. Such an arrangement allows the series of arms 22 to accommodate longer drawer travel $T_D$ between the closed position and the open position. The drawer 14 has a width $W_D$ and the clearance $C_D$ between the back wall 34 of the cabinet 12 and the rear wall 28 of the drawer 14 in closed position.

Referring to the FIGS. 3-10, an exemplary embodiment of an electrical outlet mounting apparatus 300 is illustrated. The electrical outlet mounting apparatus 300 may be configured in a variety of ways. In the illustrated embodiment, the electrical outlet mounting apparatus 300 includes one or more electrical connections 302, such as electrical outlets (e.g., standard U.S. 120 volt receptacle), USB ports, etc., an electrical cord 304 including a plug 306, a plurality of movable arms 310 for housing and managing at least a portion of the electrical cord 304, a mounting plate 311, and a cover 313.

Figure 3:
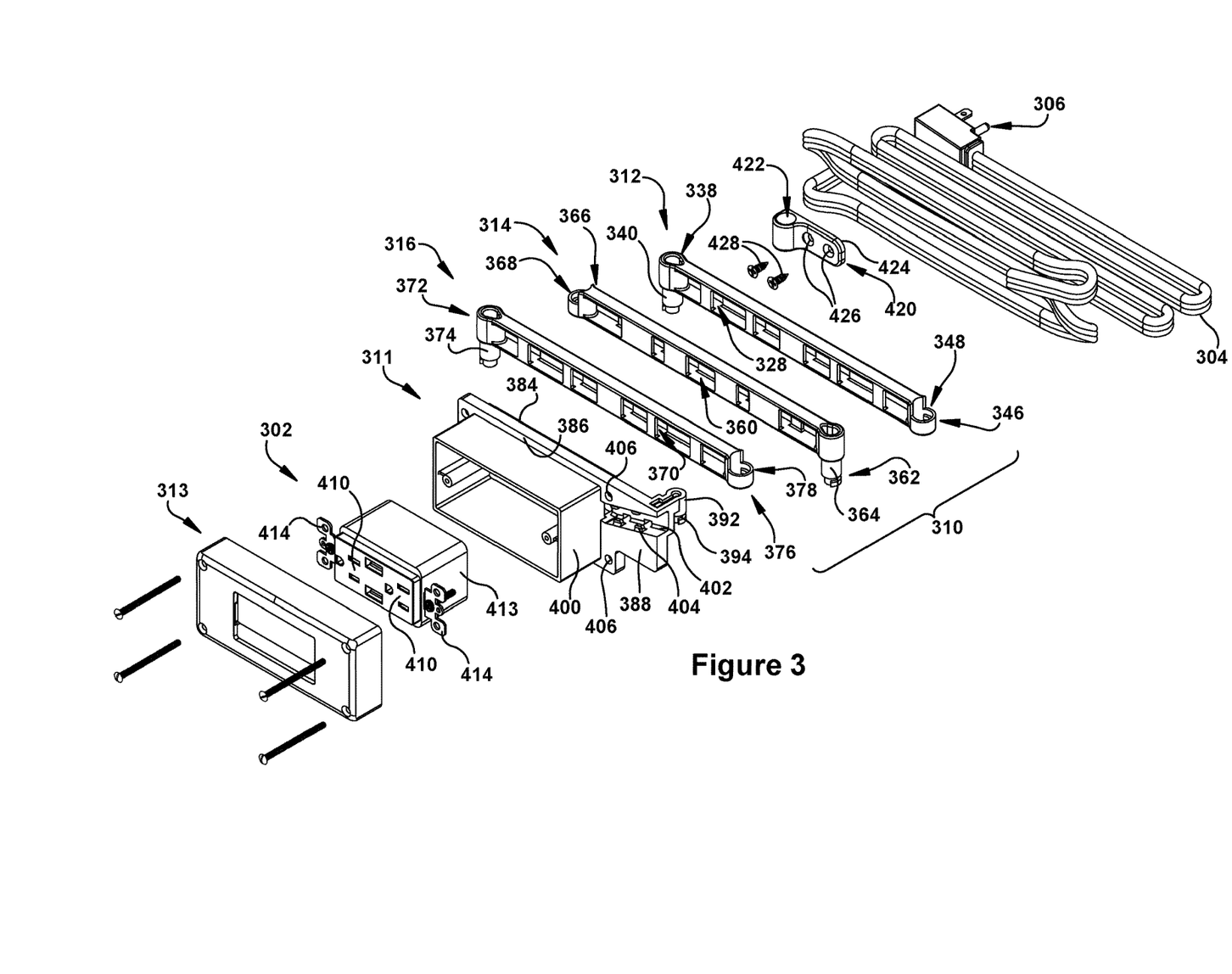
FIG. 3 is an exploded view of an exemplary embodiment of an electrical outlet mounting apparatus.

The plurality of moveable arms 310 may be configured in a variety of ways. For example, the number of arms, the length and width of the arms, the cross-sectional shape of the arms, and other aspects of the arms may vary in different embodiments. In the illustrated exemplary embodiment, the electrical outlet mounting apparatus 300 includes a first arm 312, a second arm 314, and a third arm 316. In other embodiments, however, the plurality of moveable arms 310 may include more than or less than three arms.

Figure 6:
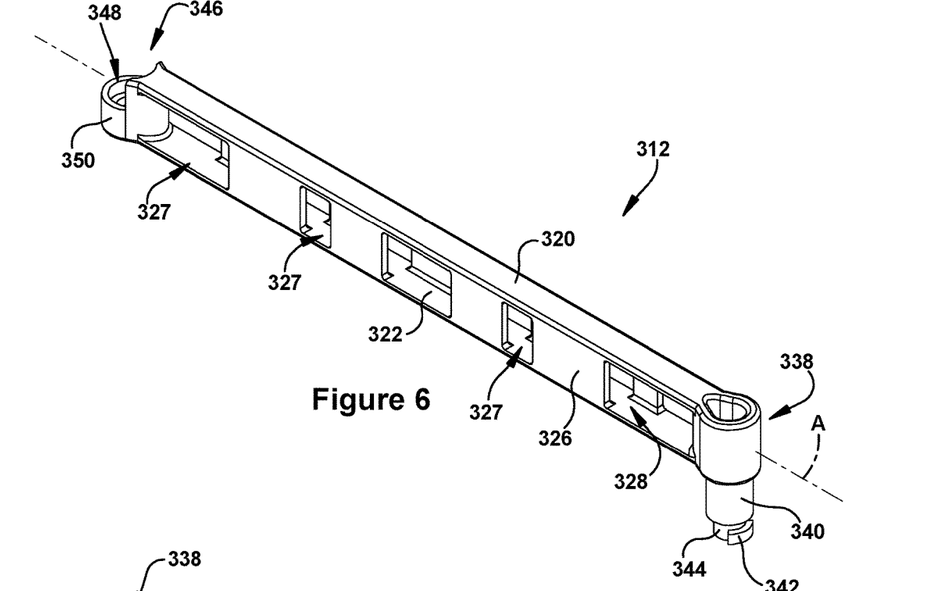
FIG. 6 is a rear perspective view of an arm of the apparatus of FIG. 3.
Figure 7:
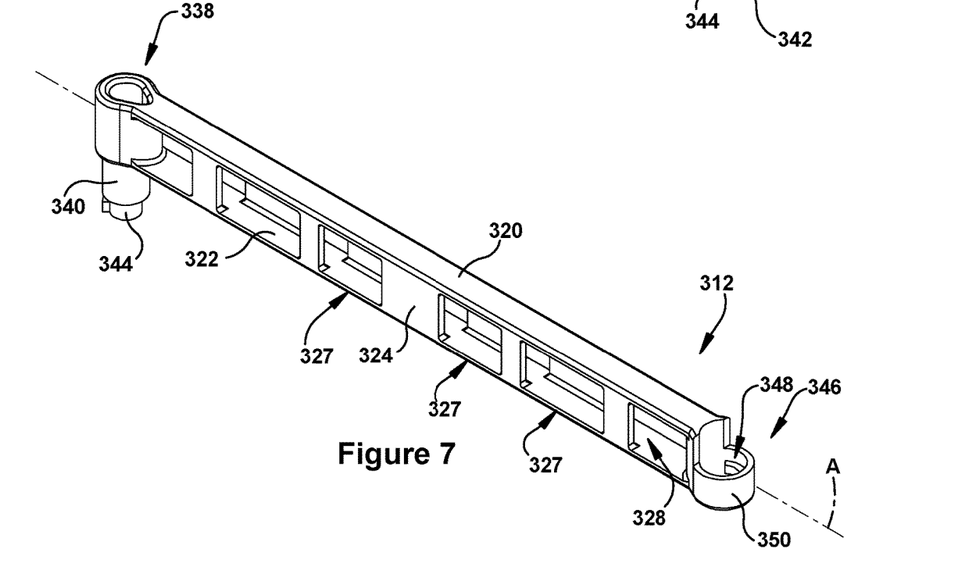
FIG. 7 is a front perspective view of the arm of FIG. 6.

Referring to FIGS. 6 and 7, the first arm 312 has a rectangular cross-sectional shape formed by a first wall 320, a second wall 322 spaced apart from and generally parallel to the first wall, a third wall 324 extending between and generally perpendicular to the first and second walls, and a fourth wall 326 spaced apart from and generally parallel to the third wall 324 and extending between and generally perpendicular to the first wall 320 and the second wall 322. The third wall 324 and the fourth wall 326 include a plurality of wall sections or tabs separated by open spaces 327 along the length of the walls 324, 326. The walls 320, 322, 324, 326 define a channel 328 in which at least a portion of the electrical cord 304 can be positioned. The plurality of open spaces 327 facilitate inserting the cord 304 in the channel 328 third wall 324 and the fourth wall 326 retain the cord 304 within the channel 328.

The first arm 312 includes a first end 338 having a projection 340 extending downward. The projection 340 includes a radially extending tab 342 at the distal end 344 of the projection 340. The tab 342 extends generally along the longitudinal axis A. The first arm 312 includes a second end 346 having an aperture 348 configured to receive the projection 340 of another arm, such as the second arm 314, or similar projection on the mounting plate 311. In the illustrated embodiment, the aperture 348 is formed from an annular wall 350 positioned proximate to the second wall 322 (i.e., closer to the second wall 322 than to the first wall 320). The annular wall 350 includes an inner circumferential lip 352 having a slot configured to allow the tab 342 to pass through. The slot 354 is positioned generally along the longitudinal axis A on the inner portion of the annular wall 350.

In the illustrated embodiment, open spaces 327 associated with the third wall 324 are positioned adjacent the first end 338 and open spaces 327 associated with the fourth wall 326 are positioned adjacent the second end 346 such that the third wall 324 and the fourth wall 326 are open adjacent each of the ends 338, 346.

Figure 10:
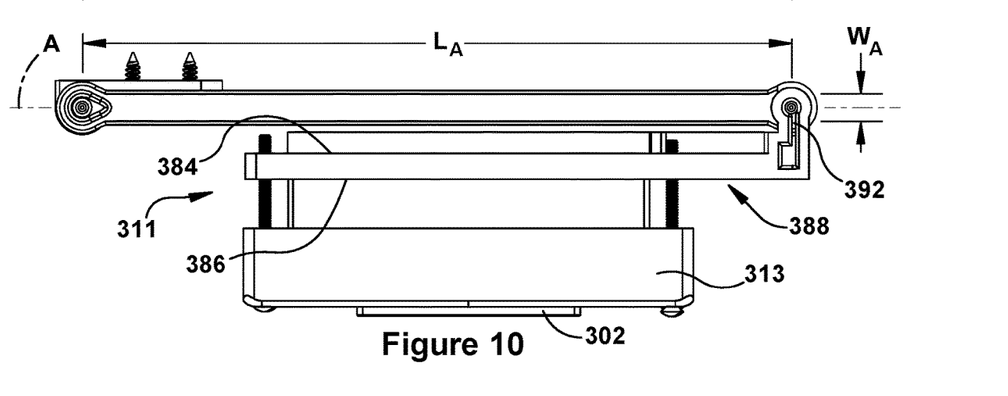
FIG. 10 is a top view of the apparatus of FIG. 3 in a collapsed position with the electrical cord removed.

In the exemplary embodiment, the first arm 312, the second arm 314, and the third arm 316 are substantially identical. In other embodiments, however, one or more of the arms 312, 314, 316 may differ from one or more of the other arms. For example, one or more arms may be longer, shorter, narrower or wider than another of the arms. In the exemplary embodiment, the first arm 312, the second arm 314, and the third arm 316 are generally elongated along a longitudinal axis A and have a length $L_A$ and a width $W_A$ (FIG. 10). Since the first arm 312, the second arm 314, and the third arm 316 are substantially identical, the description of the first arm 312 applies equally to the second arm 314 and the third arm 316. Thus, the second arm 314 includes a channel 360 in which at least a portion of the electrical cord 304 can be positioned, a first end 362 having a projection 364 and a second end 366 having an aperture 368. Similarly, the third arm 316 includes a channel 370 in which at least a portion of the electrical cord 304 can be positioned, a first end 372 having a projection 374 and a second end 376 having an aperture 378.

The plurality of arms 312, 314, 316 may be constructed in any suitable manner, such as for example, from different materials and through different manufacturing processes. In the illustrated embodiment, the plurality of arms 312, 314, 316 are made from any one or more suitable plastics, such as for example, but not limited to, acrylonitrile butadiene styrene (ABS), polycarbonates (PC), ABS/PC blends, or any thermoplastics for injection molding. The plurality of arms 312, 314, 316 may be made from, for example, an injection molding process, die casting, selective laser sintering (SLS), metal forming, or other suitable processes. Thus, in the exemplary embodiment, the arms 312, 314, 316 are comprised of nonconductive material and are rotatably connected using nonconductive material. In other embodiments, however, the arms 312, 314, 316 may be made of a material other than plastic, such as for example, metal.

The mounting plate 311 may be configured in a variety of ways. In the illustrated embodiment, the mounting plate 311 is a generally rectangular shape and includes a generally planar rear surface 384 and a generally planar front surface 386 spaced apart from and generally parallel to the rear surface 384. The mounting plate 311 includes tongue 388 extending laterally outward from one side. An arm mounting portion 392 extends outward from the rear surface 384 adjacent the tongue 388. The arm mounting portion 392 is adapted to rotatably couple to one of the plurality of arms 310. In the exemplary embodiment, the arm mounting portion 392 includes a projection 394 extending downward, generally parallel to the rear surface 384. The projection 394 may be configured similar to the projections 340 364, 374 of the first, second, and third arms 312, 314, 316.

The mounting plate 311 includes an electrical outlet mounting housing 400 extending outward from the front surface 386. The electrical outlet mounting housing 400 defines a cavity for receiving the electrical connections 302 and one or more fastener holes 400 for mounting the electrical connections 302 to the mounting plate 311. In the illustrated embodiment, the electrical outlet mounting housing 400 is rectangular. In other embodiments, however, the electrical outlet mounting housing 400 can be any suitable shape and dimension capable of mounting the electrical connections 302.

The mounting plate 311 may include a strain relief feature for the cord 304. In the exemplary embodiment, the mounting plate 311 includes groove 402 (FIGS. 3, 8 and 9) on the front surface 386 extends from the side of the tongue 388 inward toward the electrical outlet mounting housing 400. The groove 402 is configured to tightly receive the cord 304 and secures the cord in place. The groove 402 may include structure to help retain the cord 304 in place. Any suitable structure may be used. For example, in the illustrated embodiment, the groove 402 includes one or more tabs or projections 404 extending laterally into the groove 402. The tabs or projections 404 resist the cord 304 from dislodging from the groove 402.

The groove 402 routes the cord 304 into the electrical outlet mounting housing 400 and to the electrical connections 302 where the cord 304 is connected to and placed in electrical communication with the electrical connections 302. The mounting plate 311 may also include one or more fastener holes 406 for receiving fasteners 408 for mounting the mounting plate 311.

The one or more electrical connections 302 may be configured in a variety of ways. For example, the type of connections, the orientation of the connections, number of connections, and the overall shape and size of the connections may vary in different embodiments. In the illustrated embodiment, the one or more electrical connections 302 include two electrical outlets 410 and two USB ports 412. In other embodiments, however, the one or more electrical connections 302 may include more or less than two electrical outlets 302, more or less than two USB ports 412 and more or less than two alternative electrical outlet or ports not illustrated, such as for example ethernet or coaxial ports, or wireless charging components, such as wireless charging components with inductive, capacitive, conductive, or magnetic resonance power transfer functionality.

The one or more electrical connections 302 may include a housing 413 and one or more mounting interfaces 414 for mounting the housing 413 to the mounting plate 311 (FIG. 3). In some embodiments, however, the one or more electrical connections 302 may be formed integrally with the mounting plate 311.

Figure 9:
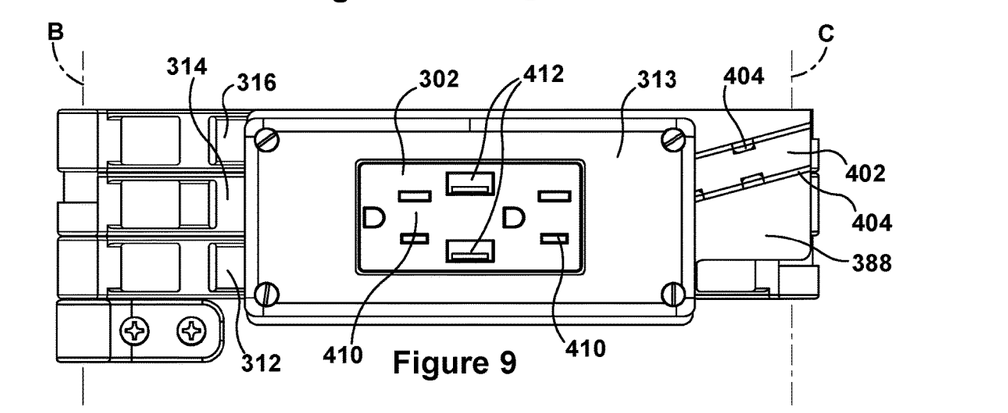
FIG. 9 is a front view of the apparatus of FIG. 3 in a collapsed position with the electrical cord removed.

When the electrical outlet mounting apparatus 300 is assembled, the second end 346 of the first arm 312 is rotatably connected to the first end 362 of the second arm 314, the second end 366 of the second arm 314 is rotatably connected to the first end 372 of the third arm 316 and the second end 376 of the third arm 316 is rotatably connected to the mounting plate 311. As used herein "rotatably connected" refers to rotating or pivoting about an axis perpendicular to the length of the arms, such as axis B and axis C, as shown in FIG. 9. The arms 312, 314, 316 include complementary, interlocking ends on opposing arms that allow the arms to be connected one-to-another and to the mounting plate 311 without the use of additional hardware or tools.

The complementary, interlocking ends of the arms may be configured in any suitable manner. In the illustrated embodiment, the projection 364 of the second arm 314 is received in the aperture 348 of the first arm 312, the projection 374 of the third arm 316 is received in the aperture 368 of the second arm 314, and the projection 394 on the mounting plate 311 is received in the aperture 378 of the third arm 316. Thus, the first arm 312, the second arm 314, the third arm 316, and the mounting plate 311 are connected in series. The tab-slot arrangements on the projections and apertures, described above with reference to the tab 342 on the projection 340 and the slot (not shown) in the aperture 348 of the first arm 312, allow the arms to be securely and rotatably connected together without the use of additional hardware or tools.

The electrical outlet mounting apparatus 300 may be rotatably mounted onto a surface, such as for example, the inner surface 36 of the back wall 34 of a cabinet 12, as described in FIGS. 1 and 2. The electrical outlet mounting apparatus 300 may be rotatably mounted by any suitable means. In the illustrated embodiment, a mounting interface 420 is configured to fixably attach to a surface, such as a back wall of a cabinet, and to rotatably attach to the first end 338 of the first arm 312. The mounting interface 420 may be configured in a variety of ways. Any interface that can rotatably attach the electrical outlet mounting apparatus 300 to a surface may be used. The mounting interface 420 may be mounted onto the surface by any suitable means, such as fasteners, adhesive, or other ways of attachment. In the illustrated embodiment, the mounting interface 420 includes an aperture 422 configured to receive the projection 340 of the first arm 312. The aperture 422 may be configured similar to the aperture 348 of the first arm 312 to provide an interlocking connection with the projection 340. The mounting interface 420 include a tab portion 424 having one or more fastener mounting holes 426 for receiving one or more fasteners 428 to attach the mounting interface 420 to a surface.

Figure 8:
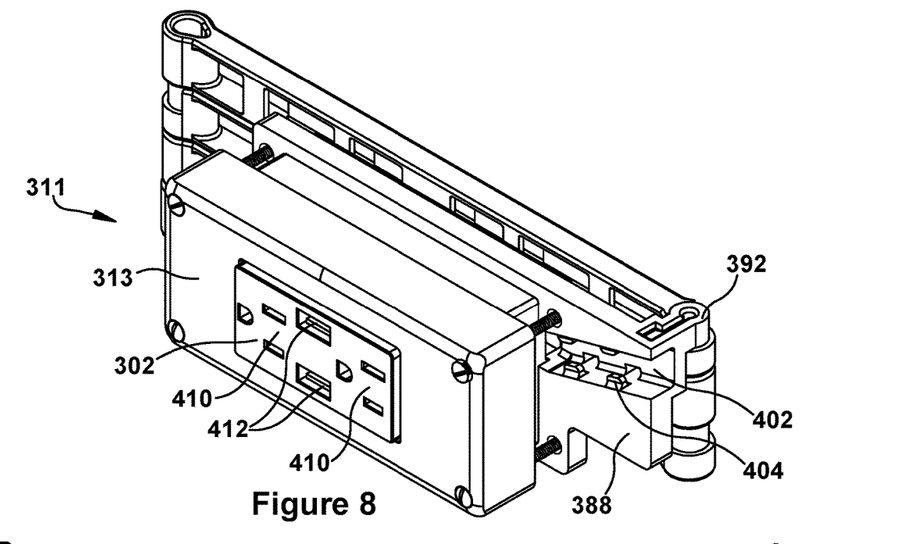
FIG. 8 is a front perspective view of the apparatus of FIG. 3 in a collapsed position with the electrical cord removed.

FIGS. 8-10 illustrate the electrical outlet mounting apparatus 300 in the collapsed position. In the collapsed position, the arms 312, 314, 316 of the apparatus 300 are positioned sufficiently parallel to one another to minimize the space taken up by the apparatus 300. In the illustrated embodiment, the arms 312, 314, 316 are arranged such that in the collapsed position, the second arm 314 is entirely, or mostly, below the first arm 312, and the third arm 316 is entirely, or mostly, below the second arm 314. Thus, the arms 312, 314, 316 are aligned or stacked vertically, or substantially vertically, and the space taken up by the arms behind the electrical connections 302 is equal to the width $W_A$ of the arms 312, 314, 316, or about the width $W_A$ of the arms. In other embodiments, however, the arms of the electrical outlet mounting apparatus may be configured and arranged differently. For example, the arms may be configured to nest partially or fully within one another or may be may be configured to nest horizontally rather than vertically. The mounting plate 311, especially in a configuration where the arms are configured to be positioned horizontally next to each other in the collapsed position, may include a horizontal groove or recessed area (not shown) to receive at least a portion of the third arm 316; thus, allowing the third arm 316 to nest in the mounting plate 311 helping to minimize space requirements for the apparatus 300.

Figure 4:
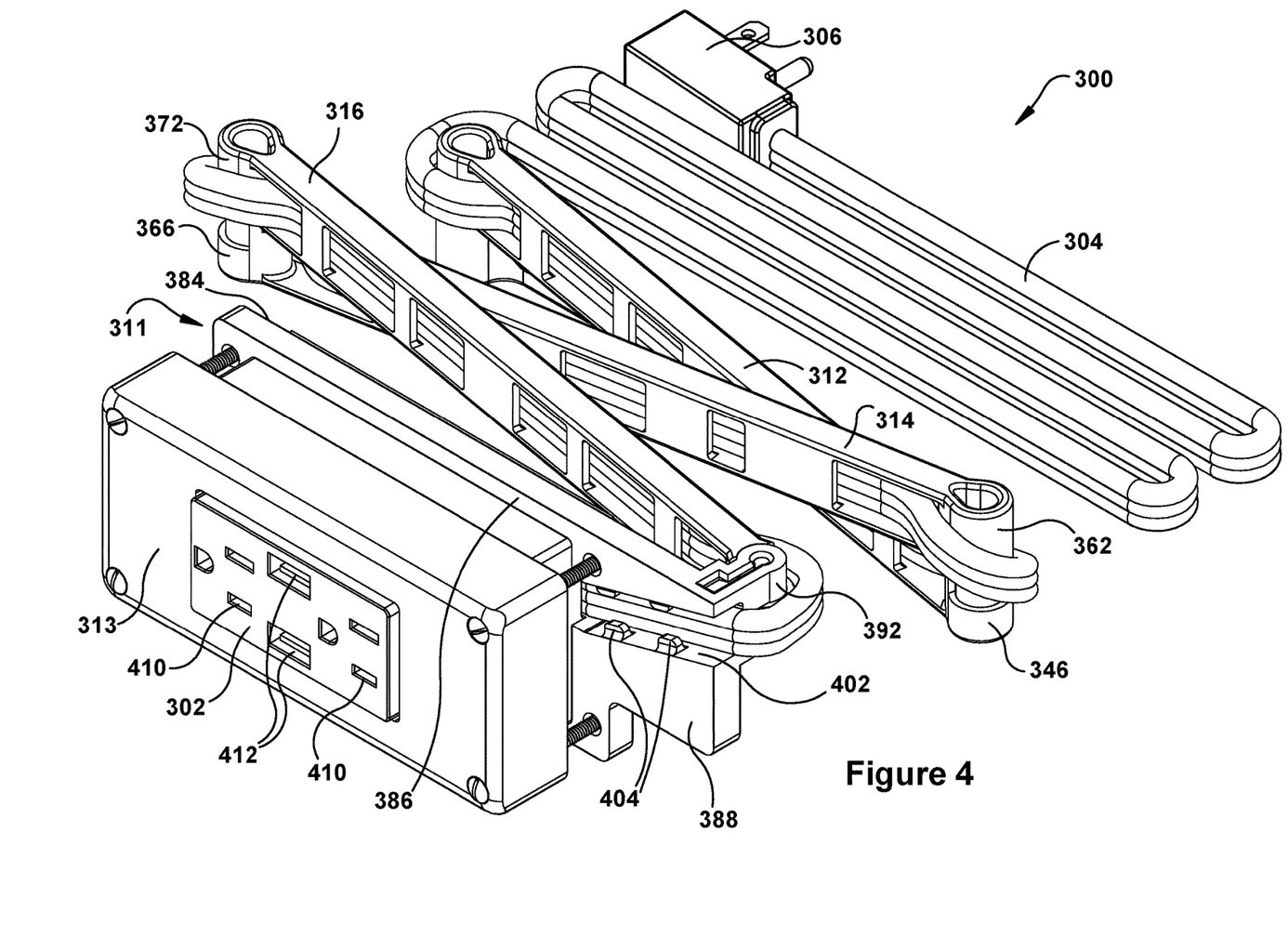
FIG. 4 is a front perspective view of the apparatus of FIG. 3 from above the apparatus.
Figure 5:
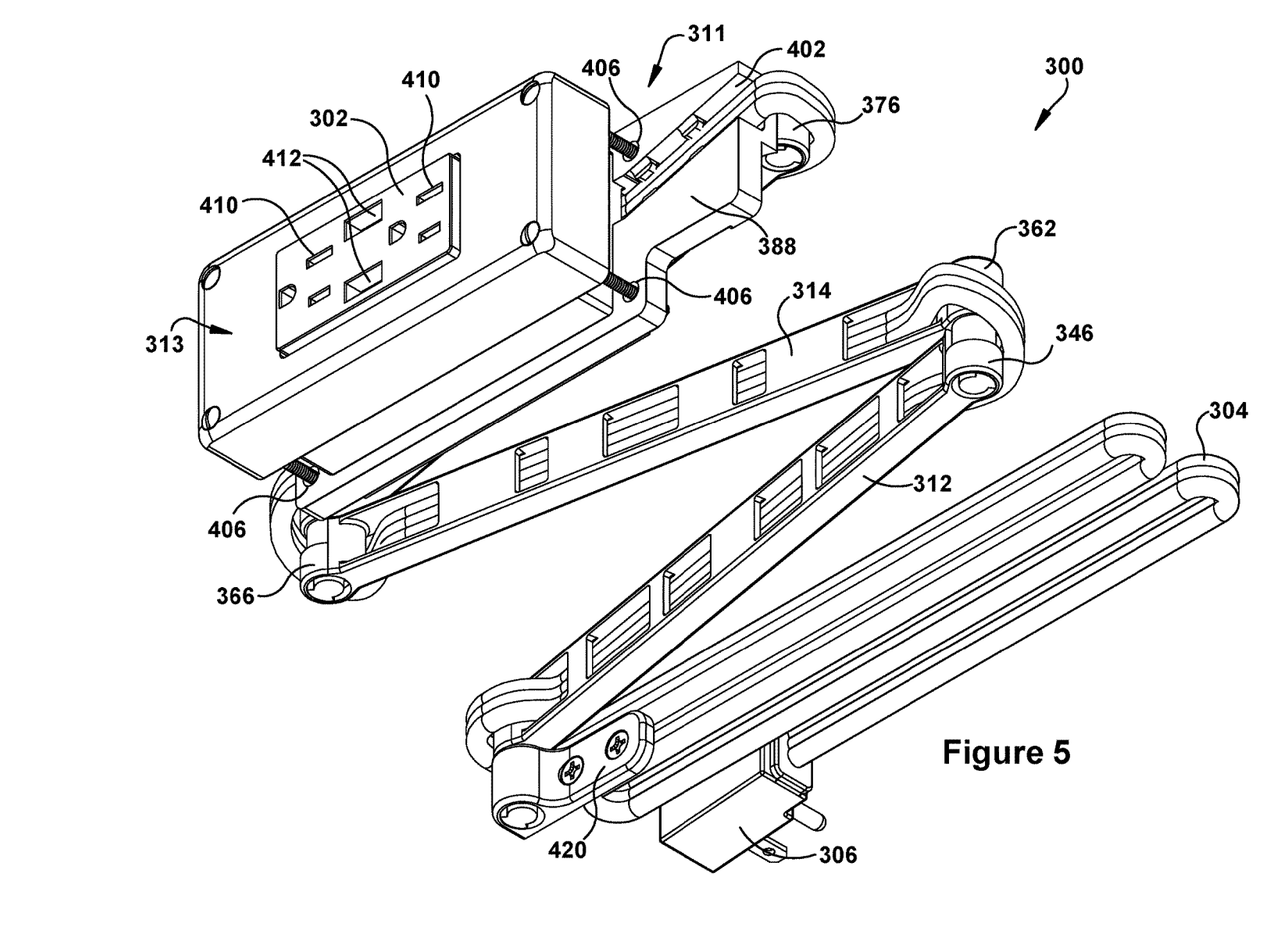
FIG. 5 is a front perspective view of the apparatus of FIG. 3 from below the apparatus.

Referring to FIGS. 3-5, at least a portion of the cord 304 is positioned to extend through the channel 328 of the first arm 312, the channel 360 of the second arm 314, and the channel 370 of the third arm 316. The channels 328, 360, 370 and tabs of the third and fourth walls 324, 326 of the arms 312, 314, 316, prevents the cord 304 from moving freely when the apparatus 300 is repositioned between the collapsed position (FIGS. 8-10) and an extended position (FIG. 11) by conforming the cord 304 to the arms 312, 314, 316 as the arms are moved.

The cord 304 is positioned through the electrical outlet mounting apparatus 300 via the channels 328, 360, 370. Since open spaces 327 are positioned adjacent the ends of each arm, the cord 304 may exit the channels 328, 360, 370 at each end of the arms and loop into the next arm or mounting plate around the ends of the arms 312, 314, 316.

For example, the cord 304 runs along the channel 328 of first arm 312, and exits first arm 312 at the second end 346 and then loops around the outside of second end 346 of the first arm 312 and enters the first end 362 of the second arm 314. The loop in the cord 304 provides slack in the cord which reduces the resistance to movement of the arms caused by the cord.

Figure 11:
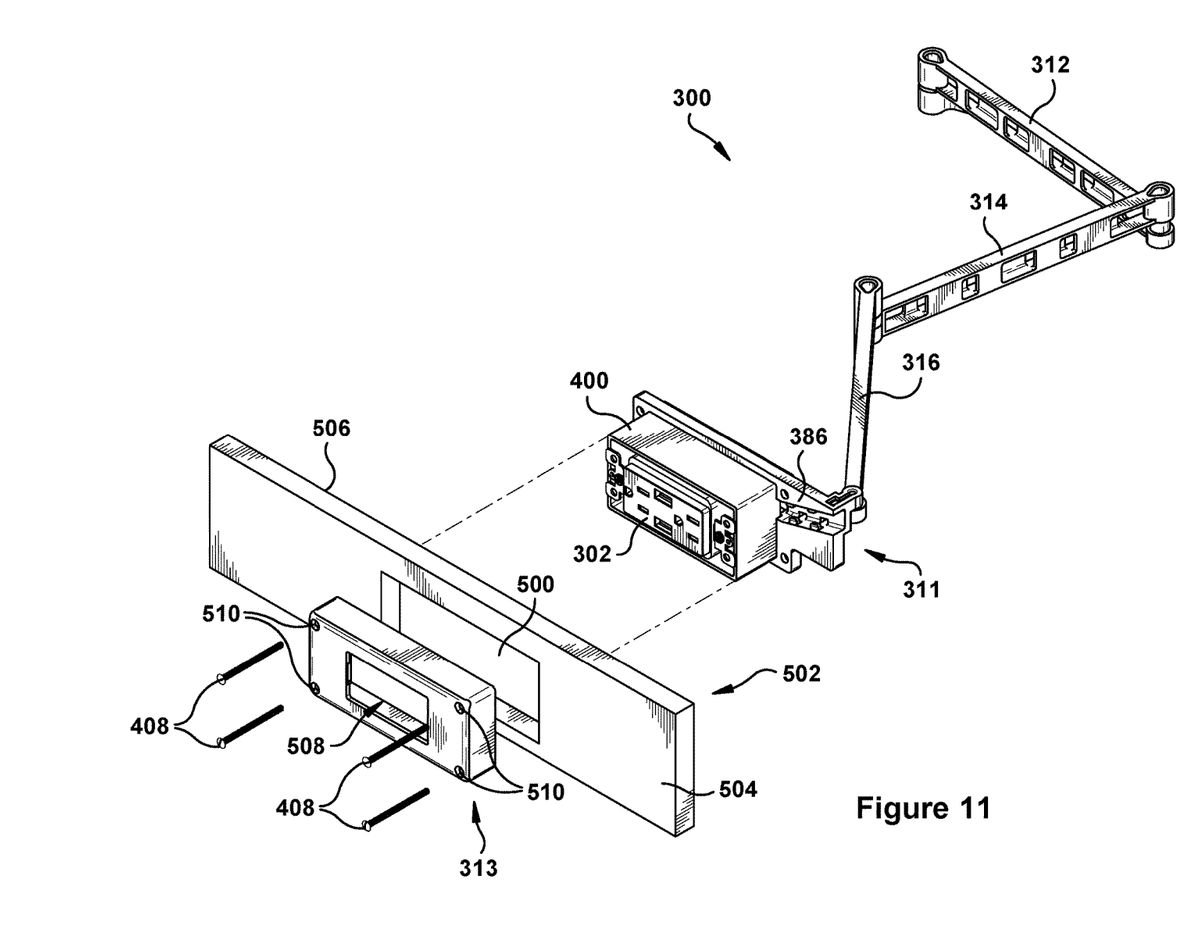
FIG. 11 is a perspective view of the apparatus of FIG. 3 illustrating mounting the apparatus with an extended cover.

As discussed regarding FIGS. 1 and 2, in some embodiments, the apparatus 300 may be mounted in a drawer 14 of a cabinet 12. The apparatus 300 may be mounted to both the back wall 34 of the cabinet 12 and mounted through the back wall 28 of the drawer 14 with the electrical connections 302 facing the inside of the drawer 14. As shown in FIG. 11, an opening 500 may be formed in a back wall 502 of the drawer. The back wall 502 may have an front surface 504 and a rear surface 506. The mounting plate 311, with the electrical connections 302 attached to it, may be positioned at the opening 500 such that the electrical connections 302 and the electrical outlet mounting housing 400 extends through the opening 500 and the front surface 386 abuts the rear surface 506 of the back wall 502. The cover 313 may be placed over the electrical connections 302 and the electrical outlet mounting housing 400 extending through the opening 500.

The cover 313 may be configured in a variety of ways, such as for example, different shapes, sizes, and materials. In the exemplary embodiment of FIG. 11, the cover 313 is generally rectangular and include an opening 508 sized to cooperatively mate with the shape of the housing 413 (FIG. 3) of the electrical connections 302. The cover 313 may include one or more fastener mounting holes 510 for receiving the one or more fasteners 408 to attach the mounting cover 313 to the back wall 502 and the mounting plate 311 via the fastener holes 406. When attached, the back wall 502 is sandwiched between the mounting place front surface 386 and the cover 313. Mounting the cover 313 and the mounting plate 311 by the fasteners 400 in this manner allows the same mounting plate 311 to accommodate a range of thicknesses of drawer back wall 502. In one exemplary embodiment, the mounting plate 311 can accommodate back wall thicknesses ranging from ½" to ¾".

Figure 12:
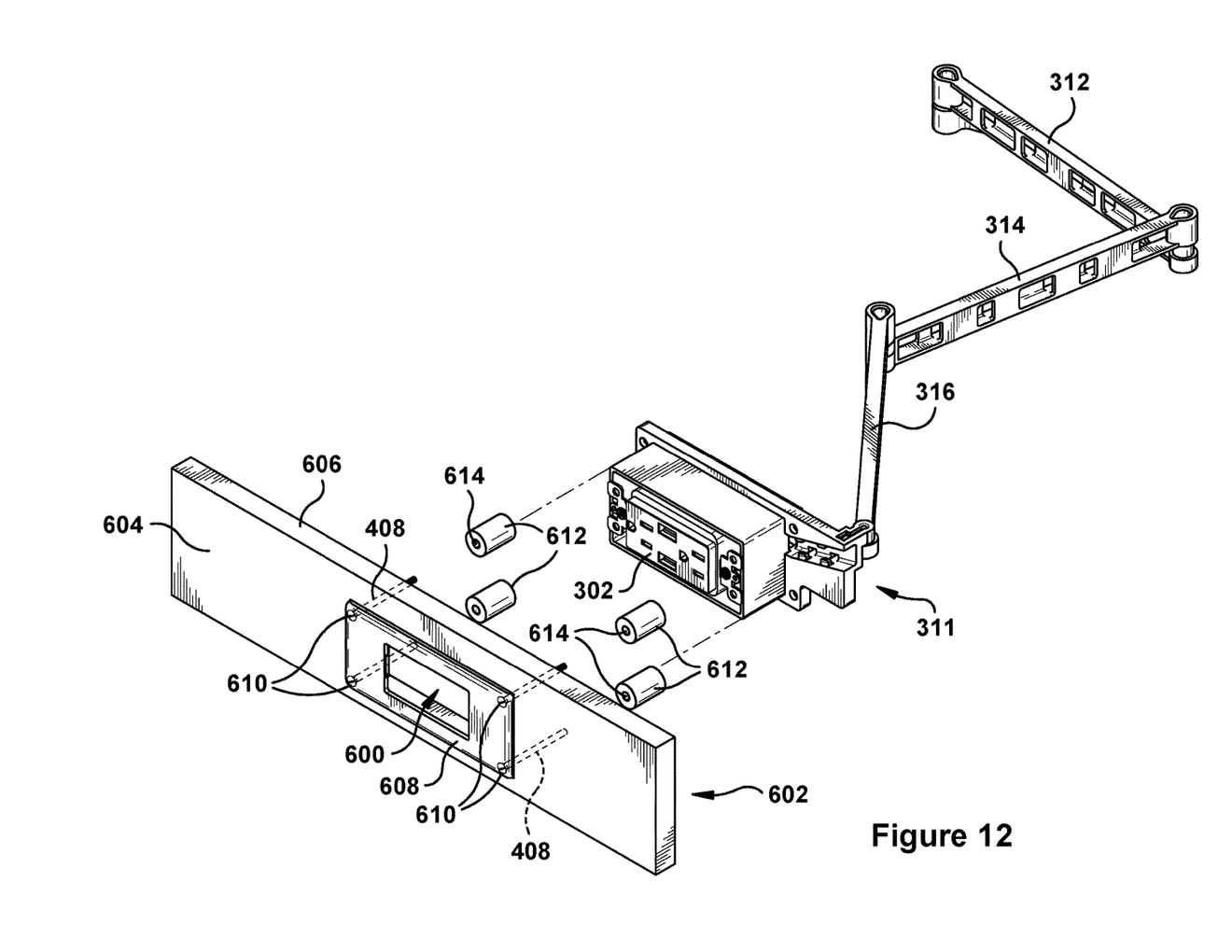
FIG. 12 is a perspective view of the apparatus of FIG. 3 illustrating mounting the apparatus with a flush cover.

Referring to FIG. 12, in another embodiment, the mounting plate 311 and electrical connections 302 may be mounted such that the electrical connections 302 lie flush with a back wall of the drawer. In the embodiment of FIG. 12, the mounting plate 311 and electrical connections 302 are mounted similar to the embodiment of FIG. 11 in that an opening 600 is formed in a back wall 602 having a front surface 604 and a rear surface 606. The mounting plate 311, with the electrical connections 302 attached to it, are positioned to extend through the opening 600 and attached to a cover 608. The cover 608, however, is thinner than the cover 313 of FIG. 12, such that the electrical connections 302 will be flush with a back wall 602 when the cover is assembled to the mounting plate 311. The cover 608 may include one or more fastener mounting holes 610 for receiving the one or more fasteners 408 to attach the mounting cover 608 to the back wall 602 and the mounting plate 311 via the fastener holes 406. When assembled, the front surface 386 of the mounting plate 311 does not abut the rear surface 606 of the back wall 602. Instead, one or more spacers 612 is provided.

The one or more spacers 612 may be configured in a variety of ways. For example, in different embodiments, the number of spacers, the size of the spacers, and shape of the spacers may differ. Any variety of spacer designs, with or without fasteners holes, may be used to provide the desired fit resulting from the full range of possible combinations of back wall 602 thickness, cover 313 design, and mounting plate 311 points of contact. In the illustrated embodiment, the spacers 612 are generally cylindrical with a central bore 614 extending through the spacers. When assembled, the spacers 612 are positioned between the rear surface 606 of the back wall 602 and the front surface 386 and the fasteners extend through the cover 608, the spacers 612 and into the mounting plate 311. In another embodiment, a single spacer plate or gasket (not shown) may be used instead of is used. The spacer plate may include an opening that receives the electrical outlet mounting housing 400 such that the spacer plate fits around the electrical outlet mounting housing 400 and is positioned between the rear surface 606 of the back wall 602 and the front surface 386. The spacer plate may include fasteners holes for receiving the fasteners similar to the spacers 612. The groove 402 allows the cord 304 access to the electrical outlet mounting housing 400 behind the spacer plate.

Referring to FIGS. 3-10, within the electrical outlet mounting housing 400 of mounting plate 311, the cord 304 is connected to the electrical connections 302 and powers the electrical outlets 410 when the plug 306 is inserted into another electrical outlet, such as for example, electrical outlet 24 of FIGS. 1 and 2.

In some embodiments, the mounting plate 311 is mounted to the drawer 14 such that the electrical connections 302 are generally centered, or toward the center, of the back wall 28 of the drawer 14. In this position, the tongue 388 extends laterally outward from one side of the mounting plate 311 such that the connection between the third arm 316 and the mounting plate 311 is offset at, near, or outside one of the sidewalls 31 of the drawer 14. Because the connection between the third arm 316 and the mounting plate 311 is located further out from the center of the mounting plate 311 toward the second side 40 of the cabinet 12 and the mounting interface 420 is mounted to the back wall 34 of the cabinet toward the first side 38 of the cabinet 12, the lengths of the arms 312, 314, 316 are able to be longer, thus allowing the apparatus 300 to extend farther in the extended position. Placement of the connection between the third arm 316 and the mounting plate 311 at the end of the tongue 388 also allows the electrical connections 302 to remain centered in the back wall 28 of the drawer 14 in all supported applications.

By mounting in the manner, the electrical connections 302 may be utilized to provide power to items placed in the drawer without cords being exposed. For example, the cord 304 may be placed to exit the cabinet 12 through the back wall 34 of the cabinet and/or through the bottom of the cabinet 12, thus allowing only one cord to exit the cabinet 12 and allowing for the cord to be hidden from normal views of the cabinet.

As the drawer 14 is closed, the apparatus 300 collapses with little resistance to the movement of the drawer 14. For example, some drawers are manufactured to include a "soft close" mechanism, which allows the drawer to close automatically for the last several inches when the user initiates closing. The open ends on the arms 312, 314, 316 of the apparatus 300 allow the cord 304 to loop around the open ends (thus allowing slack in cord 304). The slack in the cord 304 minimizes the resistance of the cord as it bends, which prevents inhibiting the soft close feature of the drawer.

In some embodiments, the apparatus 300 may be manufactured to KCMA (Kitchen Cabinet Manufacturers Association) standards which require no loss of functionality after cycle testing for 25,000 cycles. In some embodiments, the apparatus 300 is UL (United Laboratories) or ETL (Intertek Group plc.) approved in accordance with UL Standard 962A which addresses electrical safety considerations for furniture power distribution units.

Because the arms 312, 314, 316 of the apparatus 300 may be manufactured in different sizes and/or manufactured to be adjustable, the apparatus 300 may fit a number of different drawer sizes, depending on the application. In one exemplary embodiment, the apparatus 300 is configured to be applied to a drawer 14 with a width $W_D$ as small as 9 inches and a clearance $C_D$ of less than 2 inches (e.g., 1.9 inches) between the back wall 28 of the drawer 14 and the back wall 34 of the cabinet 12 when the drawer 14 is closed while still providing extension of the drawer up to a travel length $T_D$ of 24 inches. However, the inventors contemplate additional sized drawers may be fitted with the apparatus 300, depending on variations in the manufacture of the arms.

In some embodiments, the apparatus 300, when collapsed, requires minimal space and has a narrow profile. For aftermarket purchasers, this allows for the apparatus 300 to be retrofitted to drawers that are relatively shallow (e.g., 2.6" tall) and that, when closed, extend relatively far into the cabinet. The compact size of the apparatus 300 in the collapsed position allows for installation of and access to various power options without resizing the drawer height or depth, or relocating corresponding soft close glide mechanisms to allow for a more bulky, collapsed position. By providing effective wire management, apparatus 300 also helps maintain safe separation of electrical cords from moving components behind both attached and contiguous drawers and features inside the shared cabinet cavity. For original cabinet manufacturers, the compact nature of apparatus 300 when closed has the additional benefit of not requiring cost producing alterations to standard drawer construction, glide placement, inventory management (e.g., unique drawer sizes) or manufacturing processes (e.g., equipment settings, and material management). The ability to use the same unit on drawer boxes that have sides of varying thickness due to the adjustable nature of the mounting plate 311 also reduce manufacturing and inventory complexity for cabinet and furniture manufacturers.

Figure 13:
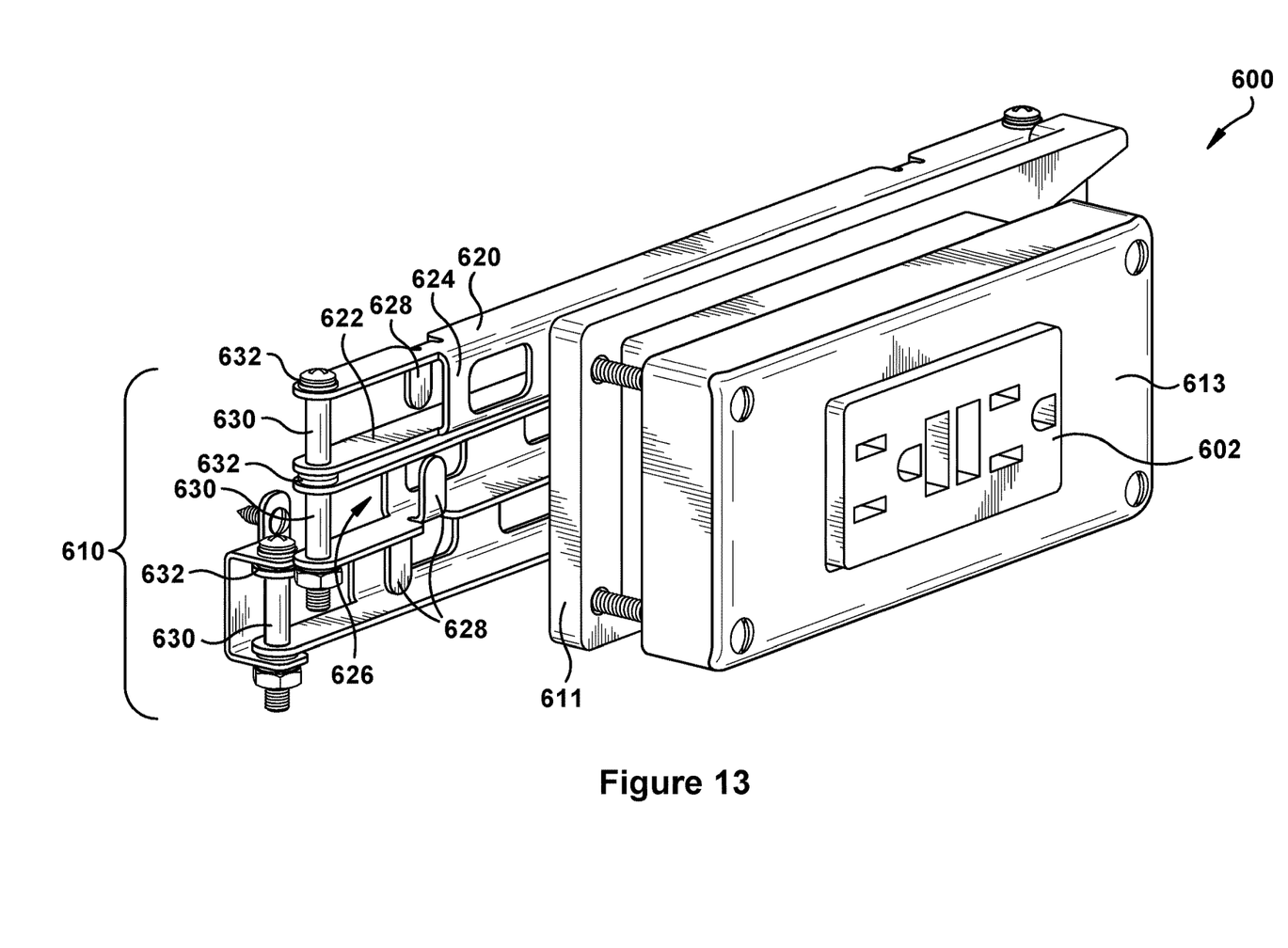
FIG. 13 is a front perspective view of an exemplary embodiment of an electrical outlet mounting apparatus.
Figure 14:
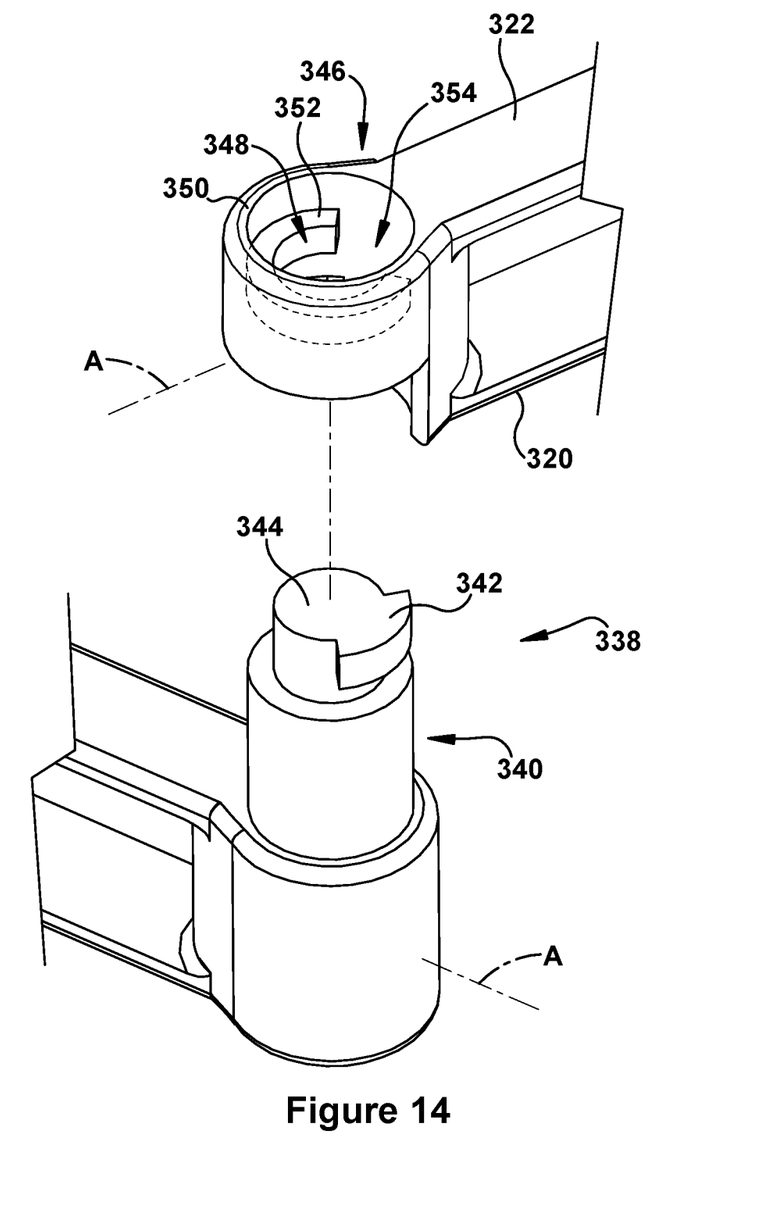
FIG. 14 is a perspective view of an exemplary embodiment of an interlocking connection at the ends of the arm of FIG. 6.

Referring to the FIG. 13, an exemplary embodiment of an electrical outlet mounting apparatus 600 is illustrated. The electrical outlet mounting apparatus 600 is similar to the electrical outlet mounting apparatus 300 of FIGS. 3-8 in that electrical outlet mounting apparatus 600 apparatus includes one or more electrical connections 602, a plurality of movable arms 610 for housing and managing at least a portion of an electrical cord, a mounting plate 611, and a cover 613. The configuration of the plurality of arms 610 and how the arms interconnect and connect with the mounting plate 611, however, differs from the arms 310 and connections in the electrical outlet mounting apparatus 300.

In particular, the arms 610 have a generally U-shaped configuration defined by a first wall 620, a second wall 622 spaced apart from and generally parallel to the first wall, and a third wall 624 extending between and generally perpendicular to the first and second walls to form a channel 626. Rather than a fourth wall, the arms 610 include a plurality of bendable tabs 628 than can be bent away from the channel 626 to allow an electrical cord to be inserted into the channel and bent inward toward the channel 626 to help retain the cord in the channel 626.

As with the electrical outlet mounting apparatus 300, the arms 610 are rotatably connected one-to-another in series and to the mounting plate 611. The connection in the electrical outlet mounting apparatus 600, however, is formed by pivot pins 630 extending through the complementary ends on opposing arms. The arms 610 are open adjacent the pivot pins 630 to allow the cord to exit the channels 626 at each end of the arms and loop into the next arm or mounting plate around the ends of the arms.

The arms 610 can be made of any suitable material. In the exemplary embodiment, the arms 610 are a stamped metal, such as aluminum. Friction reducing material, such as washers or spacers 632, may be used at the connections between the arms to contribute to smooth operation with reduced resistance during collapse and contraction of the apparatus 600.

The above description of specific embodiments has been given by way of example. From the disclosure given, those skilled in the art will not only understand the general inventive concepts and attendant advantages, but will also find apparent various changes and modifications to the structures and methods disclosed. For example, the general inventive concepts are not typically limited to cabinets and cabinet drawers. Thus, for example, use of the inventive concepts to any pull-out unit is within the spirit and scope of the general inventive concepts. It is sought, therefore, to cover all such changes and modifications as fall within the spirit and scope of the general inventive concepts, as described and claimed herein, and equivalents thereof.

The invention claimed is:

1. An electrical outlet mounting apparatus, comprising:
   a plurality of arms wherein each of the plurality of arms comprises:
      a first end and a second end, wherein the first end of one of the arms is attachable to the second end of another of the arms, and wherein the first end and second end are open;
      an electrical cord with a first cord end and a second cord end;
      a channel on the interior of each of the arms, wherein the channel receives the electrical cord such that the electrical cord enters the channel near the first end of each of the arms, and exits the channel near the second end of each of the arms;
      wherein the arms are rotatably connected in a sequence, with a first end of one of the arms being a starting end of the sequence, and the second end of another of the arms being a terminal end of the sequence;
      wherein the arms are collapsible into a collapsed position; and
      wherein the arms are extendable into an extended position; and
      wherein when the plurality of arms is in a collapsed position, the plurality of arms stack on top of one another in a direction perpendicular to a length and a width of the apparatus such that the width of the plurality of arms in the collapsed position is equal the width of one arm;
   a mounting plate, wherein the terminal end of the sequence is rotatably attached to the mounting plate, and wherein the mounting plate comprises a groove that receives the electrical cord from the second end of the terminal arm and secures the electrical cord in place; and
   one or more electrical connections attached to the mounting plate and electrically connected to the first cord end of the electrical cord.

2. The apparatus of claim 1, wherein at least one of the arms nests within at least one other of the arms.

3. The apparatus of claim 1, wherein each of the arms includes a plurality of tabs molded around the channel in the arm to secure the electrical cord in place.

4. The apparatus of claim 1, wherein the starting end is rotatably attached to a mounting interface, wherein the mounting interface allows the apparatus to be mounted to a surface.

5. The apparatus of claim 4, wherein the mounting interface is mounted to an inner surface of a back wall of a cabinet or the mounting plate is mounted to a back wall of a drawer in the cabinet.

6. The apparatus of claim 1, wherein the arms are securely connected by coupling complementary ends that attach one to the other without the use of additional hardware or tools.

7. The apparatus of claim 1, wherein the arms are comprised of nonconductive material, and wherein the arms are rotatably connected using nonconductive material.

8. The apparatus of claim 1, wherein the mounting plate includes an outlet mounting housing and a tongue that extends beyond a side of the outlet mounting housing, and wherein the terminal end of the sequence is attached to the tongue at a location beyond the side of the outlet mounting housing.

9. The apparatus of claim 8, wherein the one or more electrical connections are centered along the width of the back wall of the drawer.

10. The apparatus of claim 1, wherein the mounting plate further comprises one or more tabs extending laterally into the groove for securing the cord within the groove.

11. A cabinet assembly, comprising:
 a plurality of arms wherein each of the plurality of arms comprises:
  a first end and a second end, wherein the first end of one of the arms is rotatably attachable to the second end of another of the arms, and wherein the first end and second end are open;
  a channel on the interior of each of the arms, wherein the channel receives an electrical cord such that the electrical cord enters the first end of the arm and exits each of the arms at the second end;
 wherein the arms are rotatably connected in a sequence, with a first end of one of the arms being a starting end of the sequence, and the second end of another of the arms being a terminal end of the sequence;
 wherein the arms are collapsible into a collapsed position; and
 wherein the arms are extendable into an extended position; and
 wherein when the plurality of arms is in a collapsed position, the plurality of arms stack on top of one another in a direction perpendicular to a length and a width of the apparatus such that the width of the plurality of arms in the collapsed position is equal the width of one arm;
 a mounting plate, wherein the terminal end of the sequence is rotatably attached to the mounting plate, and wherein the mounting plate comprises a groove on the back side, wherein the groove receives the electrical cord from the second end of the terminal arm and secures the electrical cord in place;
 one or more electrical connections electrically connected to the first cord end of the electrical cord; and
 a cabinet, wherein the cabinet comprises:
  a cabinet back wall, wherein the starting end of the plurality of arms is mounted to the cabinet back wall;
  a drawer comprising a drawer back wall, the drawer back wall comprising an inner surface, an outer surface, and an opening in the center of the drawer back wall, wherein the mounting plate attaches to the drawer back wall such that the electrical outlets extend through the opening and are facing outward from the drawer back wall towards the interior of the drawer.

12. The cabinet assembly of claim 11, wherein in the collapsed position, the arms form a stack parallel to the height of the drawer back wall.

13. The cabinet assembly of claim 11, wherein the mounting plate further comprises an outlet mounting housing and a tongue that extends beyond a side of the outlet mounting housing, wherein the terminal end of the sequence is attached to the tongue at a location beyond the side of the outlet mounting housing.

14. The cabinet assembly of claim 11, wherein the plurality of arms comprises three arms.

15. The cabinet assembly of claim 11, wherein the arms are comprised of nonconductive material, and wherein the arms are rotatably connected using nonconductive material.

* * * * *